US009178915B1

(12) United States Patent
Abidogun et al.

(10) Patent No.: US 9,178,915 B1
(45) Date of Patent: *Nov. 3, 2015

(54) COOKIE PRESERVATION WHEN SWITCHING DEVICES

(71) Applicant: Sprint Communications Company, L.P., Overland Park, KS (US)

(72) Inventors: Ayodeji Abidogun, Overland Park, KS (US); Badri P. Subramanyan, Overland Park, KS (US); Nandana T. Maddumakumara, Overland Park, KS (US); Piyush Upadhyay, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/947,359

(22) Filed: Jul. 22, 2013

Related U.S. Application Data

(63) Continuation of application No. 12/939,645, filed on Nov. 4, 2010, now Pat. No. 8,495,195.

(51) Int. Cl.
G06F 15/16 (2006.01)
H04L 29/06 (2006.01)

(52) U.S. Cl.
CPC .................. *H04L 65/1066* (2013.01)

(58) Field of Classification Search
USPC ........................................................ 709/217
See application file for complete search history.

(56) References Cited

U.S. PATENT DOCUMENTS

| 6,047,268 | A  | * | 4/2000  | Bartoli et al. ............... 705/35   |
| 6,691,113 | B1 | * | 2/2004  | Harrison et al. .................. 1/1  |
| 6,757,530 | B2 | * | 6/2004  | Rouse et al. ............ 455/412.1     |
| 6,778,653 | B1 | * | 8/2004  | Kallas et al. ........... 379/201.02    |
| 6,898,631 | B1 | * | 5/2005  | Kraft et al. ................... 709/224|
| 6,928,440 | B2 | * | 8/2005  | Cordray et al. .................... 1/1 |
| 6,983,310 | B2 | * | 1/2006  | Rouse et al. ................ 709/206   |
| 7,013,469 | B2 | * | 3/2006  | Smith et al. ................. 719/328  |
| 7,080,147 | B2 | * | 7/2006  | Wang et al. .................. 709/227  |
| 7,092,370 | B2 | * | 8/2006  | Jiang et al. .................. 370/329 |
| 7,142,883 | B2 | * | 11/2006 | Rouse et al. ............ 455/552.1     |
| 7,467,183 | B2 | * | 12/2008 | Arcuri et al. ................. 709/203 |
| 7,616,971 | B2 | * | 11/2009 | Rouse et al. ................. 455/566  |
| 7,779,103 | B1 | * | 8/2010  | Fikes et al. .................. 709/223 |
| 7,987,471 | B2 | * | 7/2011  | Herzog et al. ............... 719/317   |
| 8,037,097 | B2 | * | 10/2011 | Guo et al. .................... 707/792 |
| 8,141,134 | B2 | * | 3/2012  | Brandt et al. ..................... 726/4|
| 8,176,163 | B1 | * | 5/2012  | Fikes et al. .................. 709/223 |
| 8,239,445 | B1 | * | 8/2012  | Gage et al. ................... 709/203 |
| 8,447,837 | B2 | * | 5/2013  | Devanneaux et al. ........ 709/219      |

(Continued)

OTHER PUBLICATIONS

Kristol, D. et al., RFC 2109; HTTP State Management Mechanism, Feb. 1997, IETF, pp. 1-21.*

*Primary Examiner* — Alicia Baturay

(57) ABSTRACT

Cookies differentiate users and maintain data related to a user during navigation. Cookies are used for activities such as authenticating, session tracking, and maintaining specific information about users. An embodiment facilitates a method of preserving cookies associated with a first mobile device operated by a user who begins using a second mobile device. The method includes receiving a plurality of cookies associated with the first mobile device and storing the cookies in a data store associated with a gateway server. A cookie request is received from the second mobile device and the cookies are provided to the second mobile device.

15 Claims, 7 Drawing Sheets

(56) References Cited

U.S. PATENT DOCUMENTS

| | | | |
|---|---|---|---|
| 8,495,195 B1* | 7/2013 | Abidogun et al. | 709/223 |
| 8,650,249 B2* | 2/2014 | Canning et al. | 709/203 |
| 8,856,869 B1* | 10/2014 | Brinskelle | 726/2 |
| 8,924,592 B2* | 12/2014 | Jakubowski | 709/248 |
| 2002/0078192 A1* | 6/2002 | Kopsell et al. | 709/223 |
| 2002/0184338 A1* | 12/2002 | Haines et al. | 709/218 |
| 2003/0160609 A9* | 8/2003 | Snowberg et al. | 324/300 |
| 2003/0212887 A1* | 11/2003 | Walther et al. | 713/151 |
| 2004/0049673 A1* | 3/2004 | Song et al. | 713/150 |
| 2004/0059863 A1* | 3/2004 | Andrew et al. | 711/1 |
| 2008/0243822 A1* | 10/2008 | Campbell et al. | 707/5 |
| 2008/0313336 A1* | 12/2008 | Porter et al. | 709/227 |
| 2010/0046434 A1* | 2/2010 | Weniger et al. | 370/328 |
| 2011/0296036 A1* | 12/2011 | Canning et al. | 709/228 |

* cited by examiner

COOKIE PRESERVATION WHEN SWITCHING DEVICES

CROSS-REFERENCE TO RELATED APPLICATIONS

This application is a continuation of U.S. patent application Ser. No. 12/939,645, filed Nov. 4, 2010, entitled "Cookie Preservation When Switching Devices," which is herein incorporated by reference.

SUMMARY

A high-level overview of various aspects of the technology is provided here as an overview of the disclosure, and to introduce a selection of concepts that are further described below in the detailed-description section. This summary is not intended to identify key features or essential features of the claimed subject matter, nor is it intended to be used as an aid, in isolation, to determine the scope of the claimed subject matter. In brief and at a high level, this disclosure describes, among other things, a gateway server having enhanced cookie-handling capabilities. Utilization of aspects of the technology described herein allows for preservation of cookies associated with a user when the user changes mobile devices. Utilization of other aspects of the technology allows for authenticating mobile devices using cookies.

In a first aspect, an embodiment includes computer-readable media with computer-executable instructions that facilitate an illustrative method of preserving cookies associated with a first mobile device operated by a user who begins using a second mobile device. The illustrative method includes receiving, at a gateway server associated with a mobile network, via a wireless protocol, a request from the first mobile device for access to a server in an Internet Protocol (IP) network, where the gateway server translates between wireless protocol commands and the server in the IP network. At the gateway server, the request is communicated to the server in the IP network. At the gateway server, one or more cookies associated with the first mobile device are received from the server in the IP network. The cookies are stored in a data store associated with the gateway server and the stored cookies are associated with an identifier corresponding to the first mobile device. At the gateway server, a cookie request that includes the identifier is received from the second mobile device. The cookies are provided to the second mobile device.

In a second aspect, an embodiment includes computer-readable media with computer-executable instructions that facilitate another illustrative method of preserving cookies associated with a first mobile device operated by a user who begins using a second mobile device. The illustrative method includes accessing, via the first mobile device that does not have the capability to handle cookies, a remote server that provides a service. The remote server generates a cookie associated with the first mobile device and provides the cookie to a gateway server that is located within a mobile network. The gateway server stores the cookie and associates the cookie with an identifier that corresponds to the first mobile device. A cookie request is provided to the gateway server, via the second mobile device that has the capability to handle cookies. The cookie request includes the identifier. On the second mobile device, the cookie is received from the gateway server and stored in memory located on the second mobile device.

BRIEF DESCRIPTION OF THE SEVERAL VIEWS OF THE DRAWINGS

Illustrative embodiments of the technology are described in detail below with reference to the attached drawing figures, wherein.

DETAILED DESCRIPTION

Figure 1:
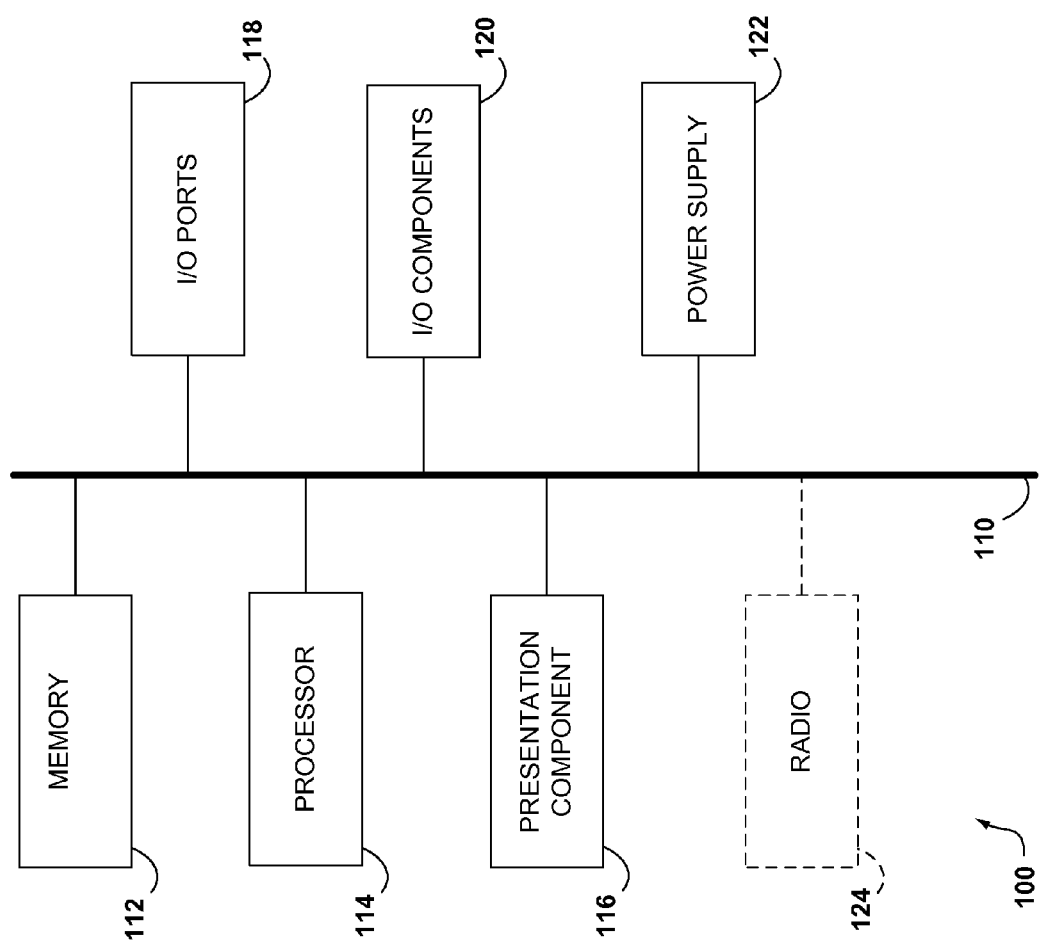
FIG. 1 depicts an illustrative computing device suitable for use in connection with an embodiment.

The subject matter of the present technology is described with specificity herein to meet statutory requirements. However, the description itself is not intended to define the technology, which is what the claims do. Rather, the claimed subject matter might be embodied in other ways to include different components, steps, or combinations of components or steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present technology. The following is a list of these acronyms:

AAA Authentication, Authorization and Accounting
CDMA Code Division Multiple Access
CM Cookie Manager
CD-ROM Compact Disc Read-Only Memory
DNS Domain Name Service
DVD Digital Versatile Disc
EDGE Enhanced Data Rates for GSM Evolution
EEPROM Electrically Erasable Programmable Read-Only Memory
EV-DO Evolution Data Optimized
FTP File Transfer Protocol
GIS Geographic Information System
GS Gateway Server
GPRS General Packet Radio Service
GSM Global System for Mobile Communications
HA Home Agent
HTTP Hyper-Text Transfer Protocol
I/O Input/Output IEEE Institute of Electrical and Electronics Engineers
IMS IP Multimedia Subsystem
IP Internet Protocol
ISP Internet Service Provider
LAN Local Area Network
LCD Liquid Crystal Display
LTE Long Term Evolution
MAG Media Access Gateway
MIP Mobile Internet Protocol
MN Mobile Network
MNO Mobile Network Operator
NAI Network Access Identifier
PDA Personal Digital Assistant
PDSN Packet Data Serving Node
PPP Point-to-Point Protocol
PTSN Public Switched Telephone Network
RAM Random Access Memory
RF Radio Frequency
ROM Read-Only Memory
UMTS Universal Mobile Telecommunications System
USB Universal Serial Bus
WAN Wide Area Network
WI-FI Wireless technologies based on one or more IEEE 802.11 standards
WiMax Worldwide Interoperability for Microwave Access
WLAN Wireless Local Area Network An embodiment of the technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices and computing devices. By way of example, computer-readable media comprise media implemented in any method or technology for storing information. Examples of stored information include computer-executable instructions, data structures, program modules, and other data representations. Media examples include, but are not limited to RAM, ROM, EEPROM, flash memory and other memory technology, CD-ROM, digital versatile discs (DVD), holographic media and other optical disc storage, magnetic cassettes, magnetic tape, magnetic disk storage, and other magnetic storage devices. These technologies can store data momentarily, temporarily, or permanently.

To provide context for the detailed description below, a brief overview of some embodiments follows. An embodiment includes enhanced gateway-server functionality. As the term is used herein, "gateway server" refers to a server that facilitates establishing a connection between a mobile device and elements of the mobile network or other networks such as, for example, the Internet. According to an embodiment, a gateway server is implemented that includes a cookie manager capable of managing, handling, storing, and generating cookies such as, for example, HTTP cookies.

Hypertext Transfer Protocol (HTTP) is a communications protocol used for retrieving inter-linked text documents (hypertext). HTTP is a request and response standard between a client, which is also known as a user agent, and a server. A mobile-to-HTTP protocol gateway server (GS) translates between standard wireless protocol commands and an application server, such as a web server on the Internet. HTTP cookies are parcels of text or data sent by a server to a client, such as a browser, and then sent back unchanged by the client each time the client accesses that server. HTTP cookies are used by Web servers to differentiate users and to maintain data related to the user during navigation. HTTP cookies are used for activities, such as authenticating, session tracking, and maintaining specific information about users. HTTP cookies are used by Web servers to differentiate users and to maintain data related to the user during navigation, possibly across multiple visits. Without using HTTP cookies, each retrieval of a Web page or component of a Web page would be an isolated event. By returning an HTTP cookie to a Web server, the browser provides the Web server with a means of connecting the current page view with prior page views.

In some embodiments, a gateway server serves as the communication intermediary between one or more wireless devices and a web server. The gateway forwards requests from a wireless device to the web server, along with a previously created HTTP cookie, if present. The gateway server also can check for any previously created HTTP cookies in its storage for that particular wireless device and web server.

In some embodiments, the enhanced gateway server can be utilized to perform authentication of users and devices, regardless of whether the user/device is connected directly to the mobile network (e.g., via a radio frequency infrastructure). In other embodiments, the enhanced gateway server can be utilized to preserve cookies associated with a user when the user switches devices.

Typically, a device performs network authentication (which can include identification of the device) when the device connects to a mobile network by way of a radio frequency (RF) infrastructure. Throughout the present disclosure, "directly connecting" to a mobile network refers to this situation—where a device connects to a mobile network by way of the RF infrastructure associated with the mobile network. Accordingly, "indirectly connecting" to a mobile network, as the phrase and its derivatives are used herein, refers to a situation in which a device connects to a mobile network by way of another network such as, for example, a local area network (LAN), a WI-FI network, or the like.

When a device connects to a mobile network and is authenticated, all of the elements of the mobile network use the identifications ascertained during authentication to identify the user. As wireless technology advances, mobile network providers are increasingly offering mobile devices that have WI-FI capability. This allows a user to connect, using the mobile device, to network a mobile by way of a WI-FI network (or other type of LAN). However, when a device connects through a LAN such as, for example, a WI-FI network, the LAN's router (which can include, for example, an access point, a gateway, and the like), is the device which is identified by remote networks such as the mobile network. That is, for example, a user may connect to a home WI-FI network using a number of devices, all of which will appear (e.g., be identified as) to be the same device to an element outside of the WI-FI network. Thus, when a user connects indirectly to a mobile network, typically there is no way for the mobile network to authenticate and/or identify the particular user or device.

An embodiment includes software and hardware mechanisms for allowing a mobile device to interact with a gateway server to send and receive cookies that can be used for authentication and identification purposes, regardless of whether the mobile device is connected directly to the mobile network. In some embodiments, the gateway server generally is located entirely within the mobile network so that communications between the gateway server and the mobile device are not accessible to other devices, parties, users, and the like. This arrangement can be advantageous during authentication procedures, for example, because information transmitted between the gateway server and the mobile device does not necessarily need to be encrypted or otherwise secured.

According to an embodiment, the gateway server maintains a cookie database in which it stores cookies on a per-user and/or per-device basis. When a user accesses the gateway server using the associated RF infrastructure, the gateway server generates a gateway cookie that can be stored on the mobile device. The gateway cookie, unlike other cookies, is destined to the gateway server (e.g., can only be sent by the mobile device to the gateway server). After storing the gateway cookie, when the user utilizes the mobile device to access the mobile network (or any other network by way of the mobile network such as, e.g., the Internet) through the gateway server, the mobile device sends the gateway cookie to the gateway server. The gateway server uses the gateway cookie to authenticate and identify the user and/or the user's mobile device.

An embodiment can also facilitate preservation of cookies. A cookie typically is created at a server (such as a web server) and sent to a mobile device to maintain session or client information. In a mobile environment, some devices have the capability to handle cookies, while others do not. According to an embodiment, the gateway server handles cookies on behalf of devices that do not have the capability to do so themselves. Smarter devices that have the capability of handling cookies do not rely on the gateway for cookie-handling. This disconnect can be problematic when a user changes devices from a device that is capable of handling cookies to a device that is not because, in the process of changing devices, the user typically loses all of the cookies stored on the gateway server on behalf of the device lacking cookie-handling capabilities.

In an embodiment, a mobile device interacts with the gateway server, sending and receiving cookies between the two. In some embodiments, when the user switches to a cookie-handling device, upon connecting to the gateway server, the new device sends a request (e.g., an HTTP request) to the gateway server that requests the gateway server to send all cookies stored on the gateway server on behalf of the old device. The gateway server, in some embodiments, transfers the stored cookies to the new device. In some embodiments, the gateway server transfers the cookies in multiple communications. At the end of the interactions, the new device will have stored thereon all of the cookies that the gateway server had previously stored on behalf of the old device. In some embodiments, the gateway server can delete the cookies once they have been transferred to the new device.

An exemplary operating environment in which an embodiment may be implemented is described below in order to provide a general context. Referring initially to FIG. 1 in particular, an exemplary operating environment for implementing an embodiment is shown and designated generally as computing device 100. Computing device 100 is but one example of a suitable computing environment and is not intended to suggest any limitation as to the scope of use or functionality of an embodiment of the technology. Neither should the computing device 100 be interpreted as having any dependency or requirement relating to any one or combination of components illustrated.

In an embodiment, computing device 100 can be a server, a bank of servers, a personal computer, a mainframe, a mobile phone, a personal digital assistant (PDA), a smart phone, a laptop computing device, a mobile computer, and the like. Computing device 100 is capable of transmitting and/or receiving one or more forms of communications. In some embodiments, computing device 100 can communicate by way of cable, a public switched telephone system (PTSN), a wireless protocol, or the like. Examples of communications that can be transmitted and/or received include voice-calls, text messages, multimedia messages, e-mails, calendar updates, task reminders, push-to-x interactions (e.g., push-to-talk (PTT), push-to-video (PTV), push-to-locate (PTL), etc.), and the like.

Computing device 100 includes a bus 110 that directly or indirectly couples the following devices: memory 112, one or more processors 114, one or more presentation components 116, input/output (I/O) ports 118, input/output (I/O) components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We reiterate that the diagram of FIG. 1 is merely illustrative of an exemplary computing device that can be used in connection with an embodiment. Distinction is not made between such categories as "workstation," "server," "laptop," "handheld device," etc., as all are contemplated within the scope of FIG. 1 and reference to "computing device."

Memory 112 includes computer-storage media in the form of volatile and/or nonvolatile memory. The memory 112 may be removable, nonremovable, or a combination thereof. Exemplary memory devices include solid-state memory, hard drives, optical-disc drives, etc. Computing device 100 includes one or more processors 114 that read data from various entities such as memory 112 or I/O components 120. Processors 114 facilitate a flow of information among all or a portion of the components shown in FIG. 1 as well as computer usable instructions that help facilitate various aspects of an embodiment of the technology. For example, in an embodiment, an operating system of computing device 100 also helps coordinate various functional aspects of the embodiment. Processors 114 operate in connection with running such an operating system. Presentation component(s) 116 present data indications to a user or other device. Exemplary presentation components 116 include a display, speaker, printing component, and the like. In some embodiment, a display enables a user to view content. In an embodiment, a display can be a touchscreen display that receives user input as well. In another embodiment, a display is a display screen for displaying content such as, for example, an LCD screen.

I/O ports 118 allow computing device 100 to be logically coupled to or interact with other components and devices including I/O components 120, some of which may be built in. Input/output (I/O) ports 118 might take on a variety of forms. Illustrative I/O ports 118 include an ear-piece or headphone jack, a USB port, an infrared port, proprietary communications ports, and the like. Illustrative I/O 120 components include a microphone, joystick, game pad, satellite dish, scanner, printer, wireless device, keyboard, pen, voice-input device, touch-input device, touch-screen device, interactive display device, a mouse, and any other item usable to directly or indirectly input data into mobile device 100.

Power supply 122 includes items such as batteries, fuel cells, or any other component that can act as a power source to power computing device 100.

In some embodiments, illustrative computing devices 100 may also include radio equipment 124. This is particularly true where computing device 100 represents a mobile communications device or various components of an infrastructure maintained by a mobile Internet protocol (MIP) service provider such as, for example, a mobile network operator (MNO), an Internet service provider (ISP), or the like. Radio equipment 124 facilitates the transmission of wireless communication signals to and from computing device 100. Illustrative protocols that can be utilized in connection with an embodiment include CDMA, EDGE, EV-DO, GPRS, GSM, UMTS, WiMAX, LTE, and the like. In some embodiments, radio equipment 124 might also facilitate other types of wireless communications including WI-FI communications, Bluetooth® communications, and GIS communications. Radio equipment 124 can facilitate wireless communications between the device 100 and a national or even global telecommunications network.

The selected components of computing device 100 are meant to be illustrative in nature, and the various lower-level details of the components are not elaborated on so as to not obscure embodiments of the technology. Some of the components may be absent in some embodiments, and additional components not shown may also be part of computing device 100. Attempting to show all of the various components of computing device 100 would obscure certain aspects, and we will refrain from such elaboration at least for the sake of brevity.

Figure 2:
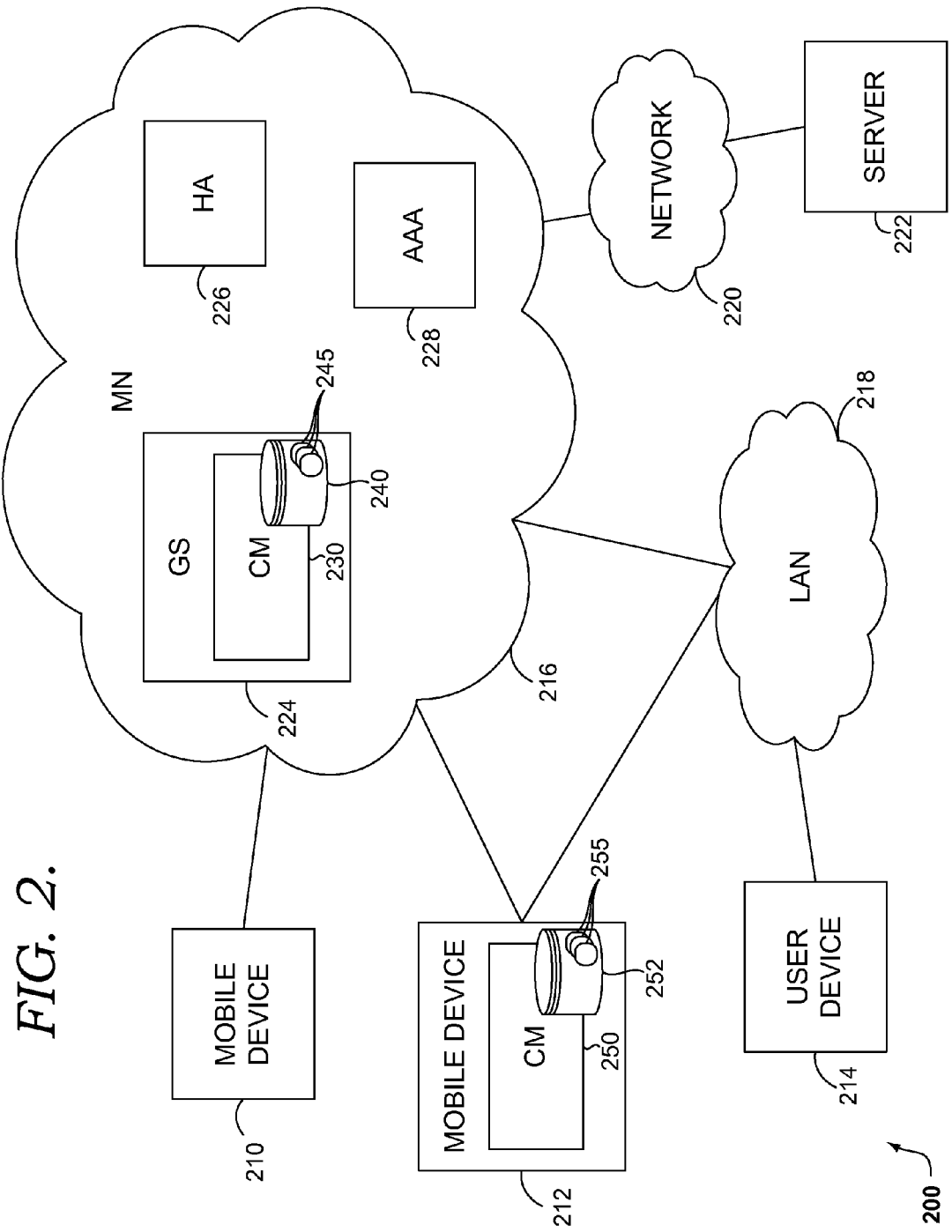
FIG. 2 depicts an illustrative network environment suitable for practicing an embodiment.

Turning now to FIG. 2, an exemplary network environment 200 is illustrated. Exemplary network environment 200 includes mobile devices 210 and 212, user device 214, mobile network (MN) 216, local area network (LAN) 218, network 220, and server 222. In an embodiment, network 220 can be any type of network such as, for example, the Internet, a local area network (LAN), a wide area network (WAN), a wireless LAN (WLAN), a mobile network (MN), a PTSN, or the like.

According to an embodiment, MN 216 can be any type of mobile network that facilitates wireless communication between mobile devices 210 and 212 and/or other devices, whether or not illustrated in FIG. 2. In an embodiment, MN 216 can utilize any number of communication protocols to facilitate wireless communication including, for example, CDMA, EDGE, EV-DO, GPRS, GSM, UMTS, WI-FI, WiMAX, LTE, and the like. Additionally, LAN 218 can be any type of local network through which mobile devices 210 and 212 and/or user device 214 can communicate with other devices, servers, networks, and the like. In some embodiments, LAN can include a wireless network that utilizes a wireless protocol to facilitate communications such as, for example, Bluetooth®, WI-FI, or the like.

The exemplary network environment 200 shown in FIG. 2 is an example of one suitable network environment 200 and is not intended to suggest any limitation as to the scope of use or functionality of embodiments disclosed throughout this document. Neither should the exemplary network environment 200 be interpreted as having any dependency or requirement related to any single component or combination of components illustrated therein. For example, in some embodiments, components of network environment 200 can be implemented in any number of configurations, using any number of machines, and the like.

In some embodiments, other arrangements and elements (e.g., machines, components, interfaces, functions, orders, servers, databases, etc.) can be used in addition to, or instead of, those shown and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions can be carried out by a processor executing instructions stored in memory.

With continued reference to FIG. 2, mobile devices 210 and 212 can be any type of mobile communications devices capable of transmitting and receiving communications by way of MN 216 including, for example, mobile phones, mobile computers, smart devices, and the like. For example, in some embodiments, mobile devices 210 and 212 can include a wireless-communications-enabled computing device 100 described above with reference to FIG. 1. User device 214 can be any type of computing device such as, for example, computing device 100 described above with reference to FIG. 1. In some embodiments, user device 214 can be a mobile device, a personal computer, a laptop, a server, and the like.

Server 222 includes any computing device capable of establishing or maintaining a network connection with a client device such as, for example, mobile devices 210 and 212 or user device 214. In an embodiment, server 222 is configured to operate as a web server. Server 222 can also operate as an application server, messaging server, File Transfer Protocol (FTP) server, chat server, media server, conference server, online-gaming server, and the like. In addition, server 222 can be a single component in a larger online application. Devices that can operate as server 222 include, but are not limited to, personal computers, multiprocessor systems, microprocessor-based or programmable consumer electronics, network personal computers, integrated devices combining one or more of the preceding devices, and the like.

In an embodiment, a user accesses server 222 using a device such as mobile device 210 or 212 or user device 214. For example, the user utilizes mobile device 210 to access server 222. To access server 222, mobile device 210 provides an access request to GS 224. GS 224 can authenticate mobile device 210 and/or the associated user utilizing authentication credentials provided by mobile device 210. In an embodiment, the authentication credentials can uniquely identify mobile device 210, the user of mobile device 210, or both.

In an embodiment, upon establishing a connection with server 222 (or otherwise accessing resources provided by server 222), server 222 generates one or more HTTP cookies (referred to herein as "cookies" for brevity) associated with mobile device 210, the communication session, the user, or any combination of these. Server 222 can provide the cookies to mobile device 210. In an embodiment, cookies can contain any type of information such as, for example, cached web site images, authentication credentials, user information, information about mobile device 210, and the like.

In an embodiment, HTTP cookies can be used by a server to recognize previously authenticated users. This can be accomplished, for example, by a user client inserting a username and password of a login page into a browser and sending them to the server. The server receives and checks the username and password, and if correct, sends back a confirmation of a successful login, together with an HTTP cookie containing a random session identification (ID) that coincides with a session stored in a database. The random session ID is provided on future visits and provides a way for the server to identify the client. In an embodiment, the browser automatically sends the HTTP cookie back to the server on each user request.

With continued reference to FIG. 2, MN 216 includes a gateway server (GS) 224, a home agent (HA) 226, and an authentication component (e.g., authentication, authorization, and accounting server (AAA) 228). In an embodiment, any one or more of network elements 224, 226, and 228 can be implemented on a single machine or any number of machines. Additionally, MN 216 can include any number of other elements arranged in any number of manners.

As illustrated in FIG. 2, GS 224 includes a cookie manager (CM) 230 that interacts with a cookie store 240 that stores cookies 245 associated with one or more of mobile devices 210 and 212 and user device 214. GS 224, in an embodiment is, or includes, a PDSN. In some embodiments, GS 224 is, or includes, a media access gateway (MAG) or some other type of gateway server. Although not shown, various other components may be subsumed within the GS 224, including HA 226 and an AAA server (e.g., AAA 228).

In an embodiment, GS 224 may act as the connection point between the Radio Access and IP networks, and may be responsible for managing point-to-point protocol (PPP) sessions between the IP network provided by the mobile provider, and a mobile device. It may also act as a network access server, providing a device access to MN 216 and/or network 220. In some embodiments, GS 224 may act as an access gateway providing simple IP and mobile IP access, foreign agent support, and packet transport for virtual private networking. In addition, GS 224 may act as a client for Authentication, Authorization, and Accounting (AAA) servers (e.g., AAA 228) and may provide mobile stations with a gateway to the IP network. Alternatively or additionally, exemplary network environment 200 may include other network elements for providing device access to MN 216 and/or network 220.

As illustrated in FIG. 2, in an embodiment, mobile device 210 may not be equipped with the capability of handling cookies. Compare this, for example, with mobile device 212, illustrated in FIG. 2, which includes a cookie manager (CM) 250 that can manage cookies 255 and store cookies 255 in a data store 252. In the case of mobile device 210, which, according to an embodiment, is not capable of handling and/or storing cookies, GS 224 can provide cookie handling, management, and storage services associated with mobile device 210. In an embodiment, as illustrated, GS 224 includes CM 230 that interacts with cookie store 240 to manage, handle, receive, provide, and store cookies 245.

In some embodiments, for example, GS 224 stores all cookies 245 received on behalf of mobile device 210. According to some embodiments, GS 224 associates stored cookies 245 with an identifier that corresponds to mobile device 210. It should be understood that GS 224 can receive cookies 245 on behalf of mobile device 210 from server 222 and any other server, network element, web site, or the like. The cookies 245 received by GS 224 can be handled, managed, stored, accessed, and the like by cookie manager (CM) 230.

In some embodiments, for example, CM 230 determines that a cookie 245 received from, for example, server 222, is associated with mobile device 210 and, in response to making this determination, stores the cookie 245 in data store 240. As part of the storing process, CM 230 associates cookie 245 with an identifier that corresponds to the user of mobile device 210. In this manner, the cookies 245 that GS 224 handles and stores on behalf of mobile device 210 can be preserved in data store 240 so that, if the user exchanges mobile device 210 for mobile device 212 (e.g., by upgrading the user's mobile plan, by trading in the mobile devices, by adding a mobile device 212 to an existing account, etc.), the cookies 245 stored on behalf of mobile device 210 can be utilized by mobile device 212.

According to some embodiments, CM 230 can create cookies. In an embodiment, for example, CM 230 creates a gateway cookie that is destined to the gateway and that is associated with a particular mobile device 210 or 212 or a user thereof. For instance, a mobile device 212 may access gateway server 224 directly (i.e., by way of a corresponding RF infrastructure). Upon receiving an access request from mobile device 212, gateway server 224 can authenticate mobile device 212. During, or after, the authentication process, gateway server 224 might determine whether mobile device 212 is WI-FI enabled. In some embodiments, mobile device 212 can provide an indication of its WI-FI capabilities in the access request or some subsequent communication. In some embodiments, gateway server 224 can access a user or device profile hosted, for instance, by HA 226. In some embodiments, profiles associated with users and/or devices can include any number of different types of information including an indication of whether a particular device is capable of connecting to a WI-FI network.

Upon determining that mobile device 212 is WI-FI enabled, CM 230 generates a gateway cookie. The gateway cookie includes authentication credentials associated with mobile device 212 and is destined for gateway server 224. Gateway server 224 provides the gateway cookie to mobile device 212, which stores the gateway cookie 255 in a local cookie store 252. In some embodiments, mobile device 212 includes a cookie manager (CM) 250 that facilitates receiving, storing, and sending gateway cookies 255 and other cookies, as desired. In this manner, when the user utilizes mobile device 212 to access gateway server 224 by way of a WI-FI network, mobile device 212 provides the gateway cookie 255 to gateway server 224, which can use the authentication credentials contained therein to authenticate and identify mobile device 212, regardless of any authentication/identification information provided by the WI-FI network.

According to some embodiments, and with continued reference to FIG. 2, HA 226 is a router on the mobile device's 210, 212 home network (e.g., MN 216) that maintains information about the device's current location, and, in an embodiment, is identified in a care-of-address. This allows the mobile device 210 or 212 to keep the same IP address even when it connects from a different location. In one instance, the home agent works in conjunction with a foreign agent (not illustrated, for brevity).

In some embodiments, AAA 228 is a server that provides Internet protocol functionality to support the functions of authentication, authorization, and accounting and is generally responsible for authentication of the user of the mobile devices 210 and 212. Authentication, as used herein, is a technique wherein the user gives credentials to the network so that the network may ensure the user's identity and also allows for accounting to be enabled so that the user may connect to the network and perform data transfers. Authorization, as used herein, refers to the granting of certain types of privileges, depending on a user's authentication, what privileges they are requesting, and the current system state. Accounting, as used herein, refers to the process of monitoring data transfers so that the end user may be charged for the usage. In some embodiments, AAA 228 can include a billing component that can be used to translate the charges into payable bills that can be distributed to the user of mobile devices 210 and 212. In some embodiments, MN 216 can include a separate billing server.

In some embodiments, AAA 228 (or a distinct billing server) can interact with, for example, server 222 to receive charging (i.e., billing) information regarding resource access and/or usage that a user of mobile device 210 or 212 experiences by utilizing mobile device 210 or 212. Similarly, in some embodiments, AAA 228 can provide server 222 with authentication credentials or device/user information. In some embodiments, AAA 228 provides server 222 with just enough information for server 222 to satisfy its charging policies, but not so much information so as to compromise the privacy and/or security of mobile devices 210 and 212 and/or the user thereof.

Figure 3:
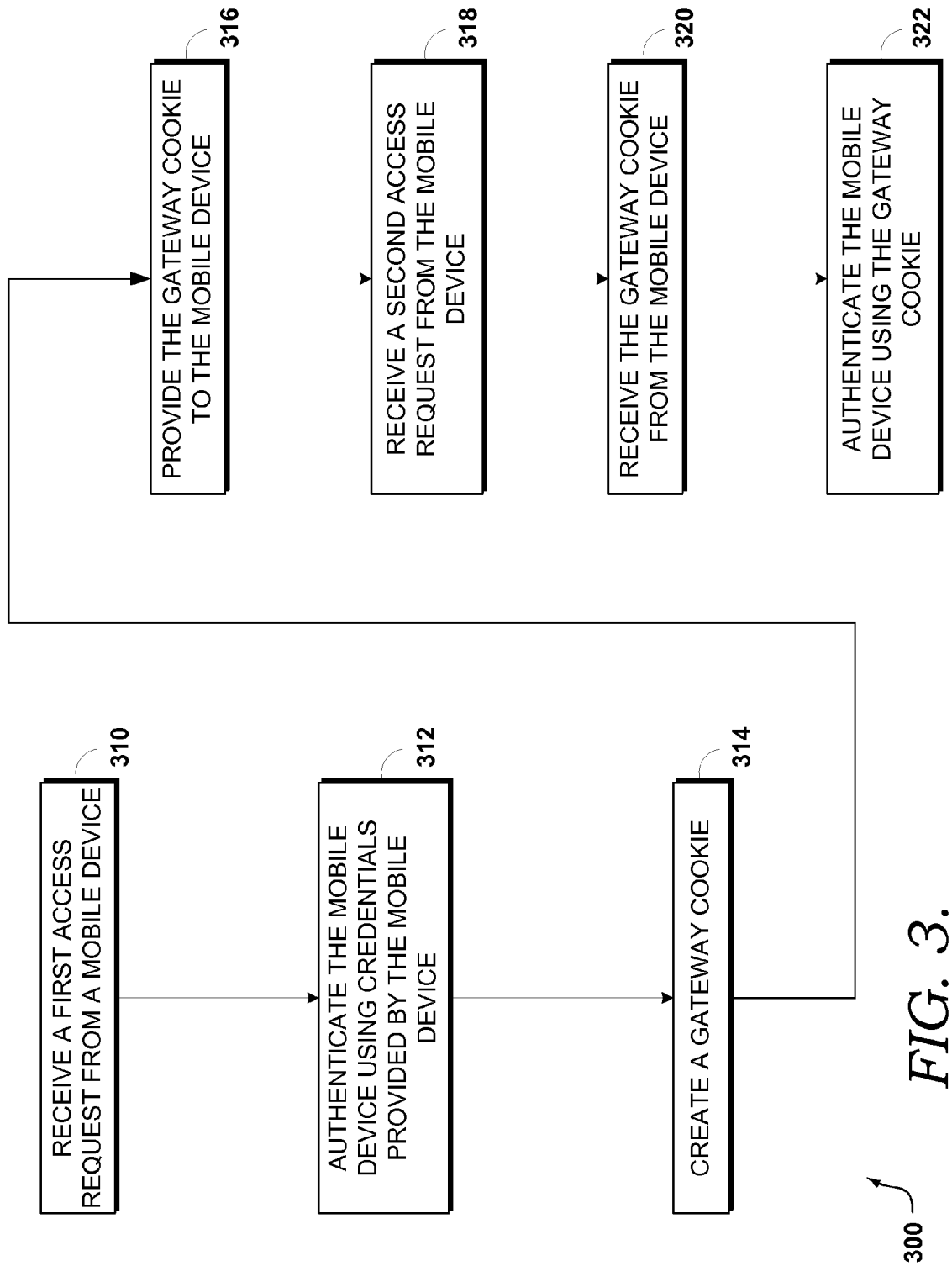
FIG. 3 is a flow diagram depicting an illustrative method of authenticating a mobile device in accordance with an embodiment.

To recapitulate, some embodiments have been disclosed in the context of computer-readable media, a communications device, and a network environment. Turning to FIG. 3, a flow diagram is provided, showing an illustrative method 300 of authenticating a mobile device. At a first illustrative step, step 310, a gateway server receives a first access request from a mobile device. In some embodiments, the first access request corresponds to a first attempt by the mobile device to access the mobile network. In some embodiments, such as when the mobile device is already connected to the mobile network, the first access request can correspond to a first attempt by the mobile device to access a resource on the mobile network or outside of the mobile network. In some embodiments, the first access request is a request by the mobile device to access the mobile network directly—that is, by way of a radio frequency infrastructure instead of, for example, by way of a local area network (LAN), wide area network (WAN), or the like.

According to some embodiments, a resource can include any type of content, service, or the like, available to the mobile device by way, at least in part, of a mobile network. In an embodiment, for example, a resource can be an application hosted by an application server, a media service hosted by a media server, services and content available via an Internet Protocol Multimedia Service (IMS) architecture, content from a web site, search services hosted by a search engine, and the like.

With continued reference to FIG. 3, at a step 312, the gateway server authenticates the mobile device using a first set of authentication credentials provided by the mobile device. As the term is used herein, authentication credentials refer to any information that can be uniquely associated with a mobile device. Illustrative examples of authentication credentials include network access identifiers (NAIs), device identifiers, user identifiers, usernames, passwords, tokens, keys, hashes, answers to security questions, and the like.

In some embodiments, the authentication credentials can be provided with the access request. In some embodiments, the authentication credentials can be provided in a communication that is distinct from the access request. In some embodiments, authentication credentials can be embedded within a packet header, a cookie, or the like. According to some embodiments, the authentication credentials can be encrypted.

With continued reference to FIG. 3, at step 314, the gateway server creates a gateway cookie that includes a second set of authentication credentials associated with the mobile device. In some embodiments, the second set of authentication credentials can be generated, assigned, or otherwise provided by the gateway server, while in some embodiments, the second set of authentication credentials can be generated, assigned, or otherwise provided by the mobile device, an associated user, or some other network element such as, for example, a home agent or AAA server. According to some embodiments, for example, the second set of authentication credentials can be an identifier generated and associated with the mobile device.

According to some embodiments, the gateway cookie is destined only for the gateway server. That is, once the cookie has been provided to the mobile device, the mobile device can only send the cookie back to the gateway server. In some embodiments, the gateway cookie is created in response to determining that the mobile device is WI-FI enabled. At step 316, the gateway server provides the gateway cookie to the mobile device. In some embodiments, the gateway cookie is stored on the mobile device.

At step 318, the gateway server receives a second access request from the mobile device. In some embodiments, the second access request includes the gateway cookie and corresponds to a second attempt by the mobile device to access the mobile network. In some embodiments, the second attempt is an attempt to access the mobile network indirectly. That is, for example, the second access attempt is an attempt to access the mobile network by connecting through a local area network (LAN) such as a WI-FI network. When the mobile device connects to the mobile network via a LAN, the mobile device generally connects through a router associated with the LAN or other network. One consequence of this type of connection can be that authentication credentials and other identifying information provided to the mobile network can be generated, assigned, or otherwise provided by the router rather than the mobile device (e.g., through IP address assignment processes, DNS name translations, etc.). As shown at step 320 in FIG. 3, the gateway server receives the gateway cookie from the mobile device and, at step 322, authenticates the mobile device using the gateway cookie.

Figure 4:
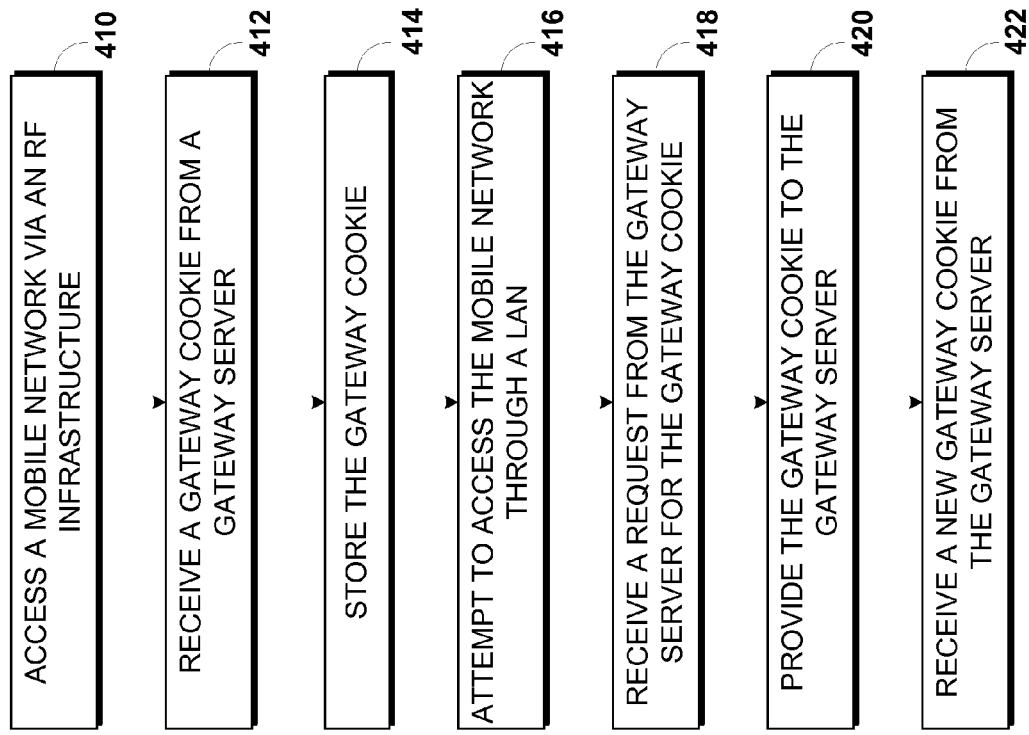
FIG. 4 is a flow diagram depicting another illustrative method of authenticating a mobile device in accordance with an embodiment.

Turning now to FIG. 4, another flow chart is illustrated which depicts an exemplary method 400 of authenticating a mobile device. At a first illustrative step, step 410, a mobile device is used to access a mobile network by way of an RF infrastructure. In some embodiments, accessing a mobile network by connecting to the mobile network directly through a corresponding radio-frequency (RF) infrastructure. According to some embodiments, the gateway server determines that the mobile device is WI-FI enabled and generates a gateway cookie in response to making this determination. At step 412, the mobile device receives the gateway cookie from the gateway server located within the mobile network. The mobile device stores the gateway cookie, as shown at step 414. In some embodiments, the gateway cookie includes a set of authentication credentials associated with the mobile device.

At step 416, the mobile device attempts to access the mobile network through a LAN. At step 418, the mobile device receives a request from the gateway server for the gateway cookie and, in response, the mobile device provides the gateway cookie to the server, as indicated at step 420. At a final illustrative step, step 422, the mobile device receives a new gateway cookie from the gateway server. In some embodiments, the gateway server generates updated gateway cookies periodically to protect against possible security breaches to the authentication process. The new, or updated, gateway cookie includes a new set of authentication credentials. In some embodiments, the new set of authentication credentials can be a reformulation of the previous credentials such as, for example, a hash.

Figure 5:
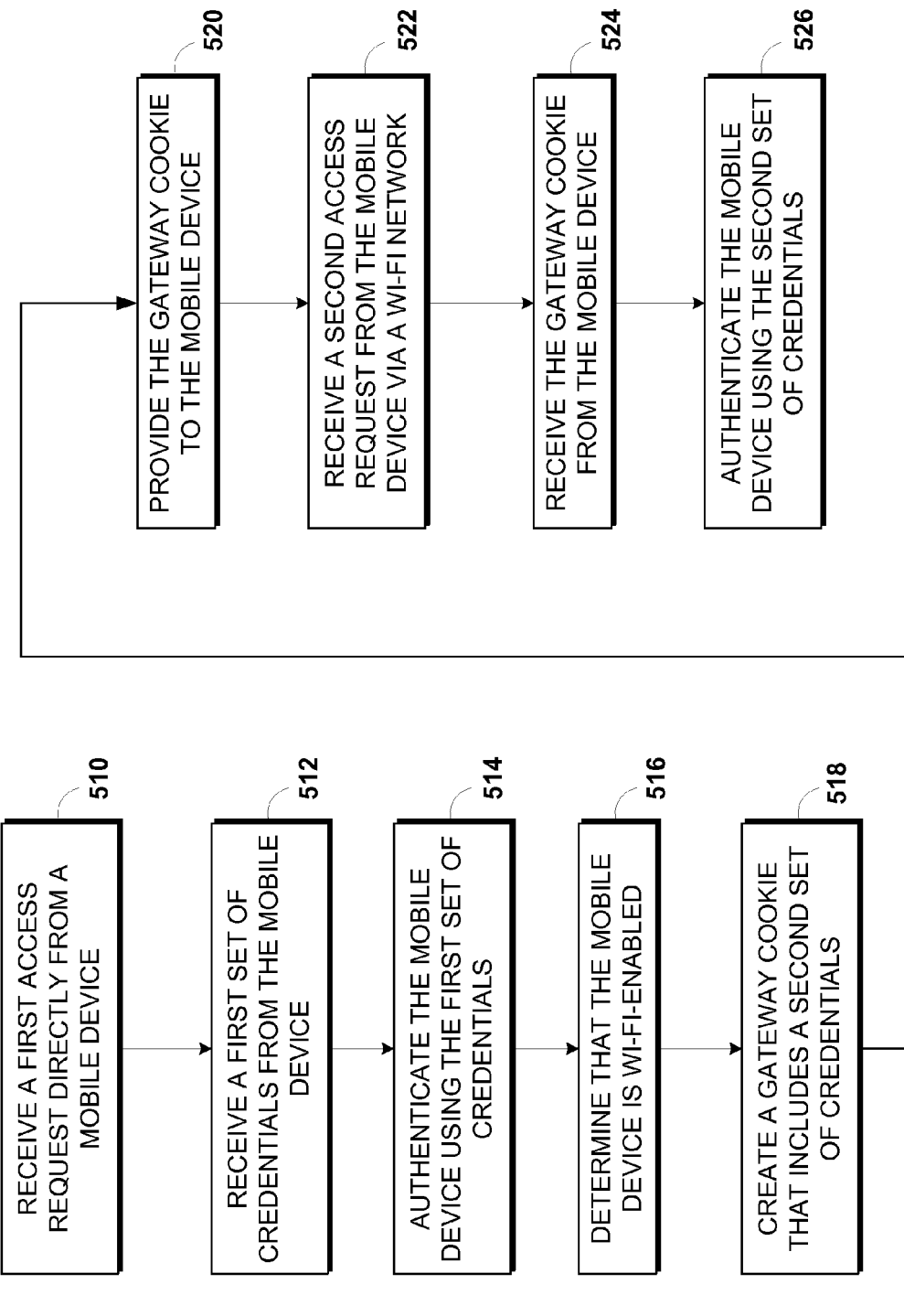
FIG. 5 is another flow diagram depicting another illustrative method authenticating a mobile device in accordance with an embodiment.

Turning now to FIG. 5, another flow chart is illustrated which depicts an exemplary method 500 of using a mobile device. At a first illustrative step, step 510, a gateway server that is located entirely within a mobile network receives a first access request from the mobile device. In some embodiments, the first access request corresponds to an attempt by the mobile device to connect directly to the mobile network. An access request may be sent to an application server, via the gateway server, in an embodiment. The purpose of the access request is to request permission from the application server for the mobile device to access a particular web page. The access request may be sent prior to or simultaneous to the mobile device attempting to access the web page.

At step 512, the gateway server receives a first set of authentication credentials from the mobile device and authenticates the mobile device using the first set of authentication credentials, as shown at step 514. In some embodiments, the first set of authentication credentials can be included with the access request, while in some embodiments, the first set of authentication credentials can be provided in a separate communication.

At step 516, the gateway server determines that the mobile device is WI-FI-enabled. In some embodiments, the mobile device can provide an indication of its WI-FI capabilities in the access request or some subsequent communication. In some embodiments, the gateway server can access a user or device profile hosted, for instance, by a corresponding HA. In some embodiments, profiles associated with users and/or devices can include any number of different types of information including an indication of whether a particular device is capable of connecting to a WI-FI network.

Upon determining that the mobile device is WI-FI-enabled, the gateway server generates a gateway cookie that includes a second set of authentication credentials associated with the mobile device, as shown at step 518. In some embodiments, the gateway cookie is destined for the gateway server. That is, the gateway cookie can only be sent to the gateway server. In this manner, the second set of credentials need not necessarily be encrypted. That is because, since the gateway server resides entirely within the mobile network, communication between it and the mobile device is secure and inaccessible to other devices and elements. As indicated at step 520, the gateway server provides the gateway cookie to the mobile device. In some embodiments, the mobile device stores the gateway cookie in memory located on the mobile device.

At step 522, the gateway server receives a second access request from the mobile device, wherein the second access request corresponds to an attempt by the mobile device to connect indirectly to the mobile network through a WI-FI network. At step 524, the gateway server receives the gateway cookie from the mobile device and, as indicated at a final illustrative step, step 526, authenticates the mobile device using the second set of credentials in the gateway cookie. In some embodiments, the gateway server can provide a third set of authentication credentials to an application server. This third set of authentication credentials can include information sufficient for the application server to identify the mobile device and/or the user, but, in some embodiments, does not include unnecessary private information. The application server identifies the mobile device using the third set of authentication credentials and provides resources to the mobile device.

Figure 6:
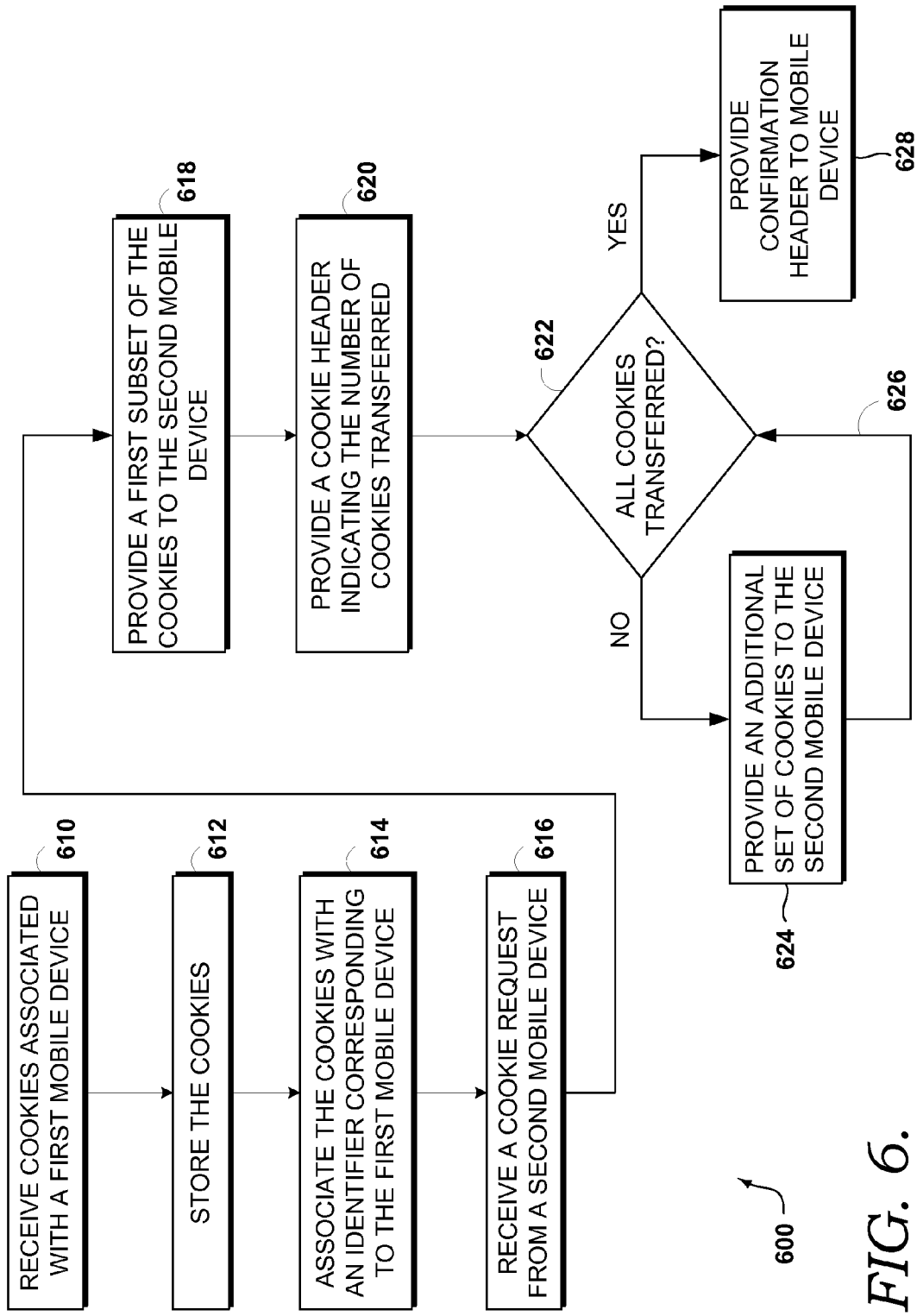
FIG. 6 is a flow diagram depicting an illustrative method of preserving cookies in accordance with an embodiment.

Turning now to FIG. 6, another flow chart is illustrated which depicts an exemplary method 600 of preserving cookies associated with a first mobile device operated by a user who begins using a second mobile device. At a first illustrative step, step 610, a gateway server receives a plurality of cookies associated with the first mobile device. In some embodiments, the cookies can be provided by servers such as web servers, application servers, and the like. The gateway server receives and handles the cookies associated with the first mobile device, in an embodiment, because the first mobile device does not include capabilities for handling cookies. In some embodiments, the first mobile device might contain cookie-handling capabilities, in which case the gateway server can provide back-up services and cookie-handling.

As indicated at step 612, the gateway server stores the plurality of cookies in a data store associated with the gateway server and, as shown at step 614, the gateway server associates the plurality of cookies with an identifier corresponding to the first mobile device. In some embodiments, the cookies can be associated with an identifier corresponding to the user of the first mobile device.

With continued reference to FIG. 6, as indicated at step 616, the gateway server receives a cookie request from the second mobile device. In some embodiments, the cookie request includes the identifier. In some embodiments, the second mobile device is provided with the identifier by the mobile network upon registration. In some embodiments, the gateway server can provide the identifier to the first mobile device, the second mobile device, or the user. In an embodiment, for example, upon registering the second mobile device, the user manually inputs the identifier in response to a request for the same. The second mobile device can include the identifier with the access request. In another embodiment, the second mobile device provides the identifier in a distinct communication. In yet another embodiment, the user can input the identifier upon being prompted by the gateway server.

In response to the request for the cookies, the gateway server provides the cookies to the mobile device. In some embodiments, however, the number of cookies may be so great that they cannot all be provided in a single communication. In that case, the gateway server can separate the cookie transfer into a series of communications. With continued reference to FIG. 6, an illustrative mechanism for accomplishing the transfer is embodied in the illustrative method 600. Other mechanisms can be implemented as well, and the embodiment depicted in FIG. 6 is but one example of these.

For instance, at step 618, the gateway server provides a first subset of the plurality of cookies to the second mobile device. In some embodiments, the gateway server can inform the mobile device that the first subset of cookies is the first of a series of subsets that will be transferred so that the mobile device will know what to expect. In an embodiment, for example, as shown at step 620, the gateway server provides a cookie header that indicates the number of cookies transferred (e.g., the number of cookies in the first subset of the plurality of cookies). In some embodiments, the cookie header (or another cookie header) can indicate the total number of cookies to be transferred, the total number of transfers to be completed, whether the transfer is complete, or any other information.

At step 622, the gateway server determines whether all of the cookies associated with the first mobile device have been transferred to the second mobile device. If not, as shown at step 624, the gateway server provides an additional set of cookies to the second mobile device and returns, as indicated at 626, to step 622. Once all of the cookies have been transferred, the gateway server provides a confirmation header to the mobile device, as shown at step 628. The confirmation header includes an indication that all of the cookies have been transferred.

Figure 7:
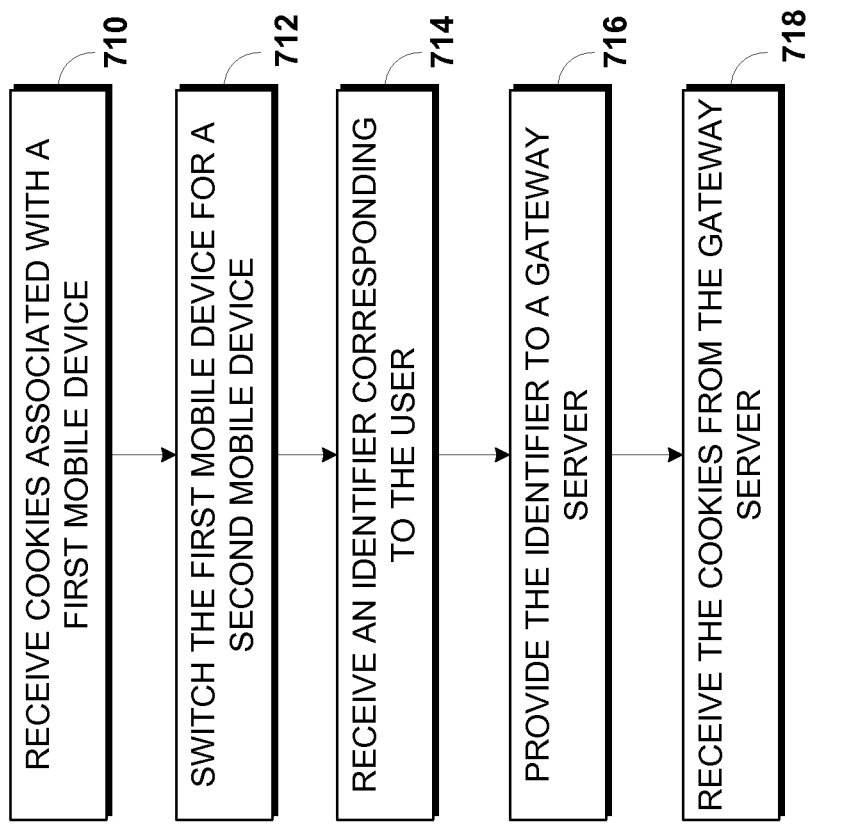
FIG. 7 is a flow diagram depicting another illustrative method of preserving cookies in accordance with an embodiment.

Turning now to FIG. 7, another flow chart is illustrated which depicts an exemplary method 700 of preserving cookies associated with a first mobile device operated by a user who begins using a second mobile device. At a first illustrative step, step 710, a gateway server receives cookies associated with the first mobile device. In an embodiment, the cookies are received as a result of accessing, using the first mobile device, a remote server that provides a service. In an embodiment, the remote server generates a cookie associated with the first mobile device and provides the cookie to a gateway server that is located within a mobile network. The gateway server stores the cookie and associates the cookie with an identifier that corresponds to the first mobile device.

At step 712, the user switches the first mobile device for a second mobile device. In an embodiment, the second mobile device is equipped to handle and/or manage software such as cookies, while the first mobile device was not so equipped. At step 714, an identifier corresponding to the user is received, and at step 716, the identifier is provided to the gateway server by way of the second mobile device. At a final illustrative step, step 718, the second mobile device receives the cookies from the gateway server. In some embodiments, the cookie can be stored in memory located on the second mobile device.

Many different arrangements of the various components depicted, as well as components not shown, are possible without departing from the scope of the claims below. The technology has been described with the intent to be illustrative rather than restrictive. Alternative means of implementing the aforementioned can be completed without departing from the scope of the claims below. Certain features and subcombinations are of utility and may be employed without reference to other features and subcombinations and are contemplated within the scope of the claims.

We claim:

1. One or more nontransitory computer-readable media having computer-executable instructions embodied thereon that, when executed, facilitate a method of preserving cookies associated with a first mobile device operated by a user who begins using a second mobile device, the method comprising:
    at a gateway server located in a mobile network, receiving from the server in the IP network one or more cookies associated with the first mobile device;
    storing the one or more cookies in a data store associated with the gateway server, wherein said storing includes associating the one or more cookies with an identifier corresponding to the first mobile device;
    at the gateway server, receiving a cookie request from the second mobile device, the cookie request including the identifier; and
    providing the one or more cookies to the second mobile device;
    wherein when the gateway server cannot provide all of the one or more cookies in a single response, the method further includes:
        A) providing a first subset of the one or more cookies to the second mobile device in a first response, and
        B) providing a second subset of the one or more cookies to the second mobile device in a second response.

2. The media of claim 1, wherein the first mobile device is not enabled to handle cookies and the second mobile device is enabled to handle cookies.

3. The media of claim 2, wherein the gateway server is located entirely within the mobile network.

4. The media of claim 3, wherein the gateway server does not encrypt any of the one or more cookies.

5. The media of claim 1, wherein the gateway server deletes the one or more cookies stored in the data store upon providing the one or more cookies to the second mobile device.

6. The media of claim 1, further comprising providing a cookie header with said first subset, wherein the cookie header indicates the number of cookies in the first response.

7. The media of claim 6, wherein the cookie header indicates the total number of the one or more cookies.

8. A method of preserving cookies associated with a first mobile device operated by a user who begins using a second mobile device, the method comprising:
    accessing, using the first mobile device that does not have the capability to handle cookies, a remote server that provides a service, wherein the remote server is located in an Internet protocol (IP) network and generates a cookie associated with the first mobile device and provides the cookie to a gateway server that is located within a mobile network, wherein the gateway server stores the cookie and associates the cookie with an identifier that corresponds to the first mobile device;
    providing, using the second mobile device that has the capability to handle cookies, a cookie request to the gateway server, wherein the cookie request includes the identifier;
    receiving, on the second mobile device, one or more cookies comprising the cookie, from the gateway server; and
    storing the cookie in memory located on the second mobile device;
    wherein when the gateway server cannot provide all of the one or more cookies in a single response, the method further includes:
        A) receiving a first subset of the one or more cookies on the second mobile device in a first response, and
        B) receiving a second subset of the one or more cookies on the second mobile device in a second response.

9. The method of claim 8, further comprising providing user input to the second mobile device, wherein the user input includes information about the identifier.

10. The method of claim 9, wherein said user input includes the identifier.

11. The method of claim 9, wherein said user input includes a command that initiates a process whereby the second mobile device retrieves the identifier from the gateway server.

12. One or more nontransitory computer-readable media having computer-executable instructions embodied thereon that, when executed, facilitate a method of preserving cookies associated with a first mobile device operated by a user who begins using a second mobile device, the method comprising:
    accessing, using the first mobile device that does not have the capability to handle cookies, a remote server that provides a service, wherein the remote server is located in an Internet protocol (IP) network and generates a cookie associated with the first mobile device and provides the cookie to a gateway server that is located within a mobile network, wherein the gateway server stores the cookie and associates the cookie with an identifier that corresponds to the first mobile device;
    providing, using the second mobile device that has the capability to handle cookies, a cookie request to the gateway server, wherein the cookie request includes the identifier;
    receiving, on the second mobile device, one or more cookies comprising the cookie, from the gateway server; and
    storing the cookie in memory located on the second mobile device;
    wherein when the gateway server cannot provide all of the one or more cookies in a single response, the method further includes:
        A) receiving a first subset of the one or more cookies on the second mobile device in a first response, and
        B) receiving a second subset of the one or more cookies on the second mobile device in a second response.

13. The media of claim 12, further comprising providing user input to the second mobile device, wherein the user input includes information about the identifier.

14. The media of claim 13, wherein said user input includes the identifier.

15. The media of claim 13, wherein said user input includes a command that initiates a process whereby the second mobile device retrieves the identifier from the gateway server.

* * * * *